Feb. 2, 1971   W. LIMBERGER   3,560,084
EXPOSURE DEVICE FOR COPYING APPARATUS
Filed April 25, 1968   2 Sheets-Sheet 1

Feb. 2, 1971   W. LIMBERGER   3,560,084
EXPOSURE DEVICE FOR COPYING APPARATUS
Filed April 25, 1968   2 Sheets-Sheet 2

United States Patent Office 3,560,084
Patented Feb. 2, 1971

3,560,084
EXPOSURE DEVICE FOR COPYING APPARATUS
Walter Limberger, Hamburg-Poppenbuttel, Germany, assignor to Lumoprint Zindler KG, Hamburg, Germany, a corporation of Germany
Filed Apr. 25, 1968, Ser. No. 724,193
Claims priority, application Germany, Apr. 28, 1967,
L 56,380
Int. Cl. G03b 27/00
U.S. Cl. 355—1
8 Claims

ABSTRACT OF THE DISCLOSURE

An exposure device for a photographic copying apparatus in which a fiber-optical array is spaced from the image source. The optical fibers are provided with light-absorptive layers at the incident-light end such that the distance between the image source and the image plane across the fiber optical network in millimeters corresponds to the length of the absorptive sheath or layer along the optical fiber, multiplied by the maximum tolerable lack of definition in microns and divided by the cross-section of the fiber parallel to the measurement of the lack of definition in microns.

---

The invention relates to exposure devices for copying apparatus.

With continuous exposure devices it is known to arrange an optical fiber assembly for transmitting a reproduction of the original to a copying material and to provide two guides for the copying material which may be in the form of a web.

In order to make possible such optical transmission, these optical fibres have an envelope or sheath of a substance whose index of refraction is lower than that of the fiber material.

In order to produce reproductions with sharp edge definition, moreover the original, whose image is to be transmitted, and the copying material or reproducing element must be arranged immediately at the ends of the array of optical fiber. In known continuous exposure devices problems arise in conjunction with constructions whereby the ends of an optical-fiber strip, which may be embedded in the carrier material, project into the web path defined by these guides; the leading edge of the copying material may then engage such projections into the guide path. With copying material in the form of a continuous web which can be gripped after its insertion in front and behind the optical-fiber arrangement, there arises the drawback that the different nature of original and copying material might result in differential rotation and in consequent distortion of the picture.

It is also known to provide at least one smooth guide for the materials upstream of the optical-fiber arrangement of a continuous exposure device wherein these materials are led along their reverse sides along suction boxes, against which they are urged by tapes. In such apparatus, the small gap between the optical fiber and sheet material results, nevertheless, in a certain lack of definition. Moreover, the tapes cover the edges and there result useless, i.e., not transmittable areas on the copying material.

In addition, known devices present problems in connection with reflux illumination, because the gap between the original and the copying material must be substantially filled by the optical fiber and no light source can be located in practice in this zone. Hence, hitherto very narrow, strip-shaped optical fibers had to be used, with the illumination being effected at their side. This does not allow for perfect illumination, because the fibers of the optical conductor are sheathed with an envelope, so that the illumination is effected only adjacent to the actual picture transmission point.

When a known optical system in the form of a system of lenses is used, the focal lengths make it necessary for all supporting surfaces to be arranged at a distance from the optical system so that a substantial amount of space is required to accommodate the arrangement.

It is therefore an object of the invention to provide an exposure device with an optical fiber system, whereby it is possible to provide copies with sharply defined edges, without requiring special additional equipment and without complicated measures for guiding the materials and for illuminating the original to be copied.

The exposure device of the invention provides a fiber-optic array, in which the ends of the fibers of the optical-fiber system form a supporting surface, and wherein the fibers are surrounded, at least over a section of their length, by a sheath or envelope with light-absorbing properties, and the distance between the original and the copying material corresponds to the length of the said section, multiplied by measure of the lack of definition, divided by the cross-section of the fiber, wherein lack of definition and cross-section are given in microns and the length of the said section in millimeters, and the gap is obtained in millimeters. In this way, a picture with marginal definition surprisingly can be obtained, even where original and copying material are arranged in spaced relationship from the optical fiber system, while in the case of reflux illumination, area illumination of the original is possible.

It can be seen that the distance will change in proportion to the length of the said section over which the fibers are provided with the light-absorbing sheath. This includes also the case, where the fibers of a plate are provided with the light-absorbing sheath over their entire length.

It should be understood that with reproduction at a 1:1 scale, for example the individual fibers may have cylindrical or polygonal cross-section. However, optical fibers permit of a magnification even with direct contact of the copying material. In this case, fiber sections are used which flare or expand in one direction. These means are known in the art, and are mentioned merely to demonstrate the possible applications of the invention.

According to a further feature of the invention, which permits perfect illumination of the original with the use of an optical-fiber plate corresponding to the size of the original, the optical-fiber system, formed in strips, is curved such that the two supporting or guide surfaces are arranged at an angle relative to each other.

According to yet another feature of the invention, the sheaths of the fibers are roughened at least along portions thereof. This provides a particularly simple means for forming the light-absorbing envelope or sheath.

In a preferred embodiment of an exposure or illuminating device according to the invention, in which one supporting surface has the dimensions of an original, a stationary contact-pressure means, such as a movable cover, is associated with this surface; another supporting surface is provided for the original, one of the supporting surfaces being formed by the optical-fiber plate and the gap between the original and the sheet of copying material is larger than the thickness of the optical fiber system so that the fibers are embedded in a light-absorbing sheath over the entire thickness of the optical-fiber plate.

Conveniently, the distance between the original and the sheet of copying paper will be chosen larger and in proportion to the thickness of the optical-fiber system, and with a thickness of the optical fiber plate of 10 millimeters, in which light-absorbing sheaths are arranged, the distance between original and copying-material sheet is below 250 millimeters, and preferably of the order of 30 millimeters.

According to a further feature of the invention, in an exposure device in which the original or the copying material passes alongside an optical-fiber system, a guide face is arranged for the other material in spaced relationship from the optical-fiber plate.

In this arrangement, a light source may radiate into the space between optical fiber system and supporting or guide surface, or a deflecting mirror may be mounted between the optical-fiber plate and the guide surface arranged in spaced relationship therefrom.

Compared with the known guide means in optical-fiber systems, the present invention provides that, on the sides of the optical-fiber system intended as guides for the original or for the copying material, there is arranged a directly operating transport and contact pressure means, e.g., a roller, revolving along this side under contact pressure. Also the space between the optical fiber and the support or guide surface for the other material is directly illuminated.

Further features and advantages of the invention will become apparent from the following description with reference to the accompanying drawing.

Figure 1:
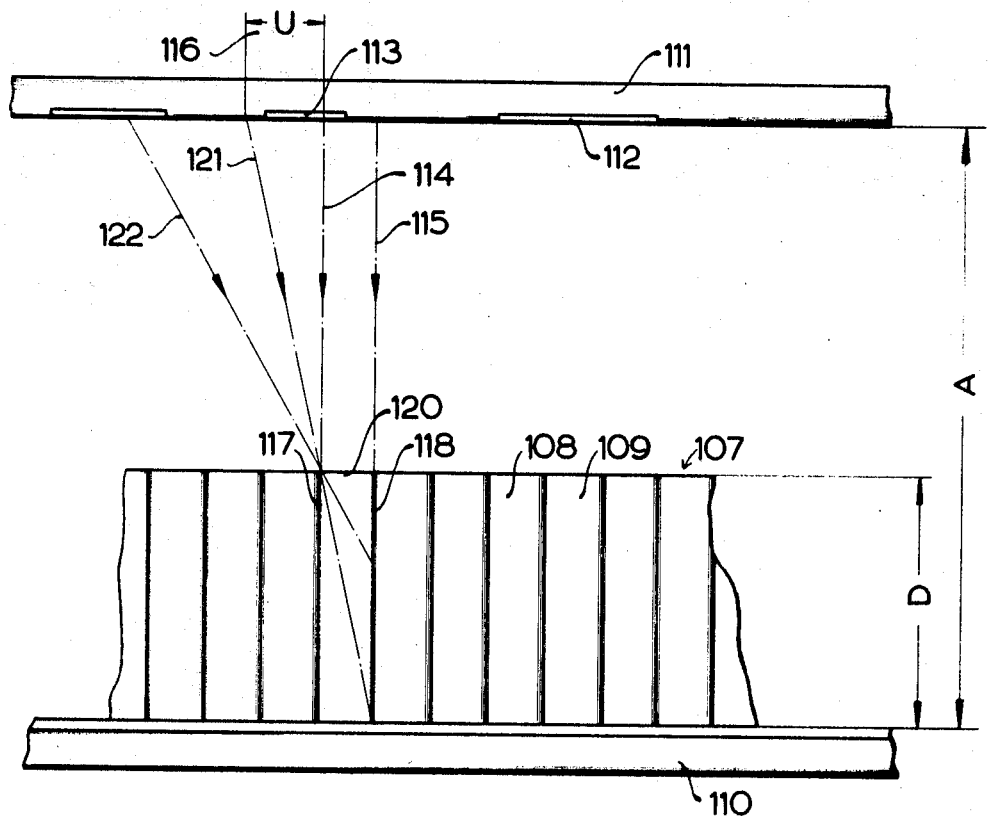
FIG. 1 is a diagrammatic partial side elevation of an optical-fiber system with associated original and sheet of copying material.

Prior to describing an apparatus, a special construction of an optical fiber system will be explained with reference to FIG. 3, which is particularly suitable for episcopic reproductions. FIG. 1 shows at 107 a section of a plate-shaped optical fiber system, having individual fibers 108, 109. Under this optical-fiber system is a sheet 110 of copying material, and, spaced from the top of this optical fiber system, there is an original 111 with pattern 112, 113. In practice, this original is held on a supporting surface, not shown here in detail.

According to the invention, the rays entering the top ends of the fibers obliquely should be restricted to a certain angle in order to avoid lack of definition. The human eye is capable of distinguishing lack of definition below 100 microns. Assuming that the rays passing parallel to the axes of the fibers, and indicated by dotted line arrows 114, 115, are completely free from lack of definition, we obtain a measure of lack of definition in terms of the fraction of a path 116, laterally of the zone defined by the arrows 114, 115.

Figure 2:
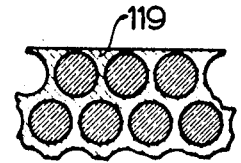
FIG. 2 is a top view of a section of an optical-fiber system.

Normal optical fibers can reflect rays passing therethrough from their walls any number of times. This is prevented according to the invention at least along a section of the optical fibers, in that the surfaces of the fibers are roughened, e.g., by dipping them into hydrofluoric acid or exposure to vapors thereof, as shown by the lines 117, 118. In addiiton, the compound 119 (FIG. 2) between the individual fibers is colored black (light-absorptive). FIG. 2 shows an embodiment with fibers having round cross-section.

In such an embodiment, for example, the fiber 120, with reference to which the following explanation is given, can pass only rays in the zone between the dotted line arrows 114, 115 and from a space, the outer limit of which is indicated by the dash-dot arrow 121. This dash-dot arrow 121 terminates at the original or master at the distance 116 from the dotted line arrow 114. It may be seen that the dash-dot arrow 121 passes through the fiber 120 rectilinearly. Rays incident outside this zone, e.g., along the arrow 122, impinge on the wall of the fiber and are absorbed thereby.

Under the assumption that one fiber has a cross-section of 4 microns, that the distance between the original 111 and the sheet 110 of copying material is given by the distance A and the thickness, (length) of the optical fiber system 107 by the dimension D, the lack of definition U results, in accordance wth the given path 116 as $$U = \frac{A \times 4}{D} (\mu)$$

Let it be assumed that the thickness D of the optical fiber system is 10 millimeters. With a permissible lack of definition of 100μ, there results a distance $A = 250$ mm. With a permissible lack of clarity of 20μ, the distance is 50 millimeters; with a permissible lack of definition of 10μ, it is 25 millimeters.

It may be seen that the distance would also alter in proportion to the thickness of the optical fiber plate. However, the example shows by means of the distance values within the range of the permissible lack of definition that an optical fiber plate or a corresponding strip of 10 mm. thickness is sufficient for producing sharply defined copies in copiers of normally used sizes.

Figure 3:
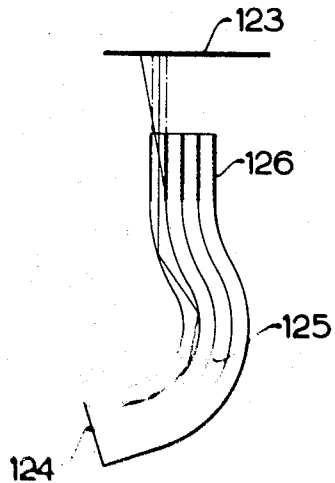
FIG. 3 shows a special configuration of an optical fiber system in diagrammatical representation.

When in FIG. 1, the fibers of the plate are roughened over their entire length D, FIG. 3 shows an embodiment in which episcopic reproductions can be produced and which can be bent. Here, the original is arranged at 123, while the sheet of copying material passes alongside the end 124 of the optical fiber system shown generally at 125. The means therefor will be described further below.

The individual strip-shaped fibers of the optical fiber system, of which four are shown on an enlarged scale, are roughened in one section 126, or provided with a light-absorbing sheath, as described hereinbefore. In this zone the fibers are straight. In the adjacent zone, up to the end 124, the fibers may be either parallel or non-parallel and bent as required so that, in practice, the original may pass at any desired angle relative to the sheet of copying paper. This is of great importance for the construction of the apparatus. Conveniently, the reflective surfaces of the fibers downstream of the section are silvered in order to improve the conductance of light.

In the following, a preferred embodiment of the apparatus will be described.

Figure 4:
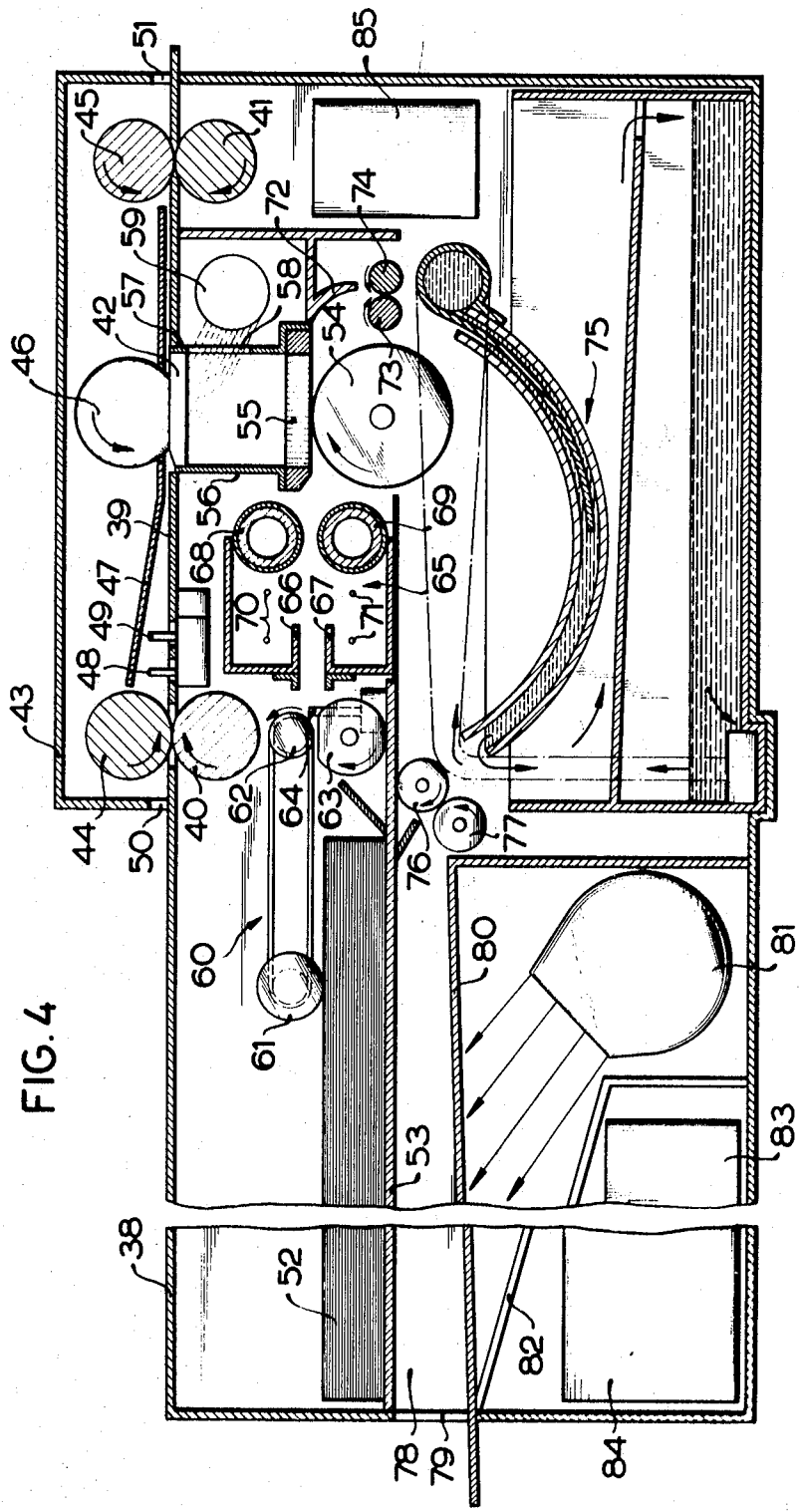
FIG. 4 is a diagrammatical side elevation of a copying apparatus for processing electro-photographic material, comprising a continuous exposure device according to the invention.

FIG. 4 shows only the components necessary for the understanding of the invention. Obviously suitable connecting means are provided. More particularly, also, the drive mechanisms for the continuous illuminating and exposure device have been omitted. The revolving parts rotate as shown by the arrows. Drive means and transmissions for this purpose are well known in the art. The parts of the continuous illuminating device are mounted in side walls extending parallel to the plane of the drawing.

FIG. 4 shows an electro-photocopying apparatus with continuous exposure and illumination. The upper surface of the housing has a support plate 38 for the original. This support plate extends at 39 over the entire top surface and has orifices through which extend rollers 40, 41. This top has a strip-shaped supporting surface 42, for example with the dimensions of 20 mm. length and 220 mm. in the direction perpendicular to the plane of the drawing. A frame 43 is mounted above the section 39 of the top 38 and contains not only the pressure rollers 44, 45 for the transport rollers 40, 41, but also a contact pressure and transport roller 46 for guiding the original along the surface 42. The roller 46 extends through a slot in a guide plate 47. The path of the original is defined by openings 50, 51 in the frame, within the zone of which there are switches 48, 49.

The copying material forms a stack 52, located underneath the supporting surface for the original and resting on an intermediate base 53. This intermediate base extends to the vicinity of a further transport and contact pressure roller 54 for the copying material. This latter transport and contact pressure roller 54 runs on the underside of a plate-shaped optical fiber system 55 having the same dimensions as the supporting surface 42 and connected thereto by vertical rim portions 56, 57, in order to form an exposure channel. In the rim portion 57, there is a hole 58 through which light from source 59 illuminates the support surface 42 from below.

On the edge of the stack associated with the illuminating device, there is arranged an intake mechanism, shown generally at 60. The same has a feed roller 61 and a combination and drawing in rollers with a continuously revolving roller 62 and a roller 63 formed with a flat. Between these, there is a limit stop 64, acting as a switch which controls the waiting position of the copying sheet in order to synchronize its running with that of the original, which triggers off the control by means of switches 48, 49. The sheet of copying material is supplied by the rollers 62, 63. Between these and the exposure device, there is a charging device 65 aligned relative to the plane of contact between transport and contact pressure roller 54 of the drawing-in mechanism and the plate-shaped optical fiber system 55. Here, strip-shaped guides 66, 67 and roller-shaped guides 68, 69 determine the path of the sheet of copying paper between charging wires 70, 71. This arrangement will not be described in detail and does not form part of this invention.

Downstream of the exposure device in the direction of travel a curved guide element 72 leads to a pair of squeeze and transport rollers 73, 74 for the sheet of copying material. Then follows, possibly via a further guide element, a developing device, shown generally at 75. It may be seen that in this region the sheet of copying material is reversed through substantially 180° to a further pair of transport and squeeze rollers 76, 77 at the outlet end of the developing section. Subsequently thereto, a section is formed by upwardly concave guide elements in the zone of which there is a developing arrangement for applying a developer to the exposed side of the sheet of electrostatic copying material, while the path continues to a delivery slot on the inlet side, at least for the original. The pair of squeeze and transport rollers 76, 77 carries the sheet of copying material into an extension of the track; this channel leads to an outlet slot 79 through which the copy is delivered. The channel 78 is defined at the top by a partition 53 and at the bottom by a partition 80. The partition 80 has numerous openings, extending preferably in an oblong manner in the direction of the channel. Drying air flows in through these holes, delivered by a blower 81 in the direction of the arrows shown in the drawing. Under a guide 82 for the charging wires, there is a high-voltage device 83 and the drive mechanism 84 with motor and transmission for the revolving parts. The switching circuit for the light source 59 is indicated diagrammatically at 85.

By way of explanation, it should be mentioned that the exposure device is shown at a scale of substantially 1:1, while all other components are drawn to a reduced scale. In order to obtain, in this arrangement, a picture or reproduction which is not laterally reversed, the electro-photographic layer must be exposed through the reverse side. This is possible and of advantage, if the coating carrier in uniform with regard to the transparency of its material. Since this is not always the case, it is necessary to provide one or an odd number of mirrors between the platform for the original and the optical fiber system.

I claim:

1. An exposure device for forming a latent image of an original in a copy layer, comprising:
   a first support surface contactable by an original-carrying layer;
   a fiber-optic bundle having a generally planar incident-light face spaced from said first support surface and composed of a multiplicity of parallel light-transmissible optical fibers together defining an image-transmitting array, said array forming a second support surface directly against said fibers and remote from said incident-light face;
   means for retaining a copy layer in contact with said second support surface; and
   illuminating means for exposing said original to light by directing light into the space between said first support surface and the planar incident-light face of said fiber optic bundle and casting an image of the original through said bundle onto said copy layer, said fibers being formed at least along a length D thereof from said incident-like surface toward said second surface with light-absorptive surfaces substantially preventing internal reflection over said length, the distance A in millimeters between the first support surface and the ends of the length being at least equal to $$\frac{U}{c}D$$

wherein U is the maximum tolerable lack of definition in microns, c is the cross-sectional thickness of the optical fiber in the direction in which the definition is determined and measured in microns and D is measured in millimeters.

2. The exposure device defined in claim 1 wherein U is equal at most to 100 microns and c is approximately 4 microns.

3. The exposure device defined in claim 2 wherein said fibers are curved and said first and second support surfaces are at an angle with one another.

4. The exposure device defined in claim 2 wherein said length D is substantially the entire length of the fiber and the distance A is the distance between said first and second support surfaces, said device further comprising means for displacing said copy layer along said second support surface and means for displacing said original-carrying layer along said first support surface in synchronism, said first support surface being composed of a transparent plate.

5. The exposure device defined in claim 4 wherein said fibers are embedded over their entire length in an opaque, light-absorptive medium.

6. The exposure device defined in claim 5 wherein the distance A is less than 250 mm., said means for displacing said layer along said support surfaces includes drive rollers lightly loaded thereagainst.

7. The exposure device defined in claim 1, further comprising a housing, an enclosure within said housing receiving said fiber-optic bundle, a transparent plate across the top of said enclosure and defining said first support surface, said illuminating means including a lamp positioned intermediate said bundle and said plate for directing light through said plate against the original-carrying layer disposed thereon, said housing being formed with a platform for receiving said original-carrying layer, first transport means for advancing said original carrying layer from said platform to said plate, second transport means co-operating with said plate for displacing said original-carrying layer thereover while retaining it against said plate, third transport means for shifting the original-carrying layer out of said housing upon its traversal of said plate, means retaining a supply of copy layers in said housing, fourth transport means for displacing said copy layers toward said bundle, fifth transport means including a roller engageable with the copy layers for urging same directly against said tube bundle along said second support surface, sixth transport means for advancing said copy layer upon its traversal of said bundle, developing means for rendering visible a latent image of the original formed on the copy layer upon its traverse of said bundle, and seventh transport means for feeding the developed copy layer out of said housing, said first through seventh transport means being synchronized for joint operation.

8. The exposure device defined in claim 7 wherein said copy layer has an electro-photographically sensitive surface, further comprising charging means along the path of said copy layer for sensitizing same prior to passage of said copy layer across said tube bundle, said tube bundle having the configuration of a plate with a thickness of about 10 mm.

References Cited

UNITED STATES PATENTS

| | | | |
|---|---|---|---|
| 1,848,814 | 3/1932 | Allen | 95—1.1 |
| 3,125,013 | 3/1964 | Herrick, Jr., et al. | 355—1 |
| 3,175,481 | 3/1965 | Lahr | 355—1 |
| 3,192,843 | 7/1965 | Kapany et al. | 355—1 |
| 3,232,201 | 2/1966 | Frank et al. | 355—1 |
| 3,267,555 | 8/1966 | Berger et al. | 355—1X |
| 3,283,651 | 11/1966 | King et al. | 355—1 |
| 3,333,277 | 7/1967 | Kaufman | 355—44X |
| 3,398,669 | 8/1968 | Hicks, Jr. | 355—1 |

JOHN M. HORAN, Primary Examiner

R. M. SHEER, Assistant Examiner

U.S. Cl. X.R.

355—50, 52